Oct. 28, 1969 W. B. CRITTENDEN ET AL 3,475,062
TIME DISCRIMINATOR
Filed May 11, 1966 3 Sheets-Sheet 1

INVENTORS
William B. Crittenden
and Susan T. Utara
BY R. Lewis Gable
ATTORNEY

Oct. 28, 1969  W. B. CRITTENDEN ET AL  3,475,062
TIME DISCRIMINATOR

Filed May 11, 1966  3 Sheets-Sheet 3

United States Patent Office 3,475,062
Patented Oct. 28, 1969

3,475,062
TIME DISCRIMINATOR
William B. Crittenden and Susan T. Utara, Baltimore, Md., assignors to Westinghouse Electric Corporation, Pittsburgh, Pa., a corporation of Pennsylvania
Filed May 11, 1966, Ser. No. 549,252
Int. Cl. H03k *5/20;* G01r *11/00*
U.S. Cl. 307—232            10 Claims

ABSTRACT OF THE DISCLOSURE

This invention comprises a time discriminator circuit for measuring the sequence and the interval between first and second input signals including first and second bistable circuits each capable of providing output signals in response respectively to the first and second input signals.

---

This invention relates to time discriminator circuits for sensing the time of occurrence of pulse signals and more particularly to such circuits which are adapted for use in radar or like systems.

Radar systems of the prior art are capable of tracking a target by first locking onto the target and continuing to supply information as to the position of the target. Such radar systems include time discriminator circuits which compare the time of occurrence of a target echo with the time of occurrence of one or more gate pulses generated in the radar system. Any change in time relationship between the signals associated with the target echo and the gate pulse is sensed and converted to an error signal. The error signal maintains constant the time relationship between the gate pulse or pulses and the echo pulse by controlling the time of occurrence of the gate pulse or pulses.

In certain time discriminators of the prior art, the interval between successive events or pulses is measured by charging a capacitor and then measuring the output voltage upon the capacitor to determine the elapsed time. However, a charge on the capacitor varies linearly with charging time only for a small fraction of its charge cycle. This establishes the linear range of the discriminator system. When the interval between the signal exceeds the linear range of the system, the output signal drops to zero so that the information derived from the discriminator system is ambiguous in that a zero reading may indicate either the receipt of no signals or the receipt of signals at intervals exceeding the linear range of this system.

It is, therefore, an object of this invention to provide a new and improved time discriminator circuit.

It is a further object of this invention to provide a new and improved circuit for accurately measuring the time interval between at least two pulses and for determining which pulse preceded the other.

It is more particularly an object of this invention to provide a new and improved time discriminator circuit having a wide aperture for measuring large intervals between input pulses.

It is a further object of this invention to provide a new and improved time discriminator circuit utilizing digital components to measure the sequence of and the interval between the input pulses.

These and other objects are accomplished in accordance with the teachings of this invention by providing a time discriminator circuit for measuring the sequence and the interval between first and second input pulses including first and second bistable circuits each capable of providing first and second output signals in response respectively to the first and second input signals. Illustratively, digital circuits such as first and second flip-flops could perform these functions. In operation, first and second input signals, the interval between which is to be measured, are applied to the first flip-flop to provide respectively "+1" and "0" output signals, and to the second flip-flop to provide "—1" and "0" output signals. Further, circuit means are provided to prevent the application of the first signal to the first flip-flop in response to the presense of the second signal to thereby indicate that the second signal precedes the first signal in time. When the second signal occurs first, the first flip-flop has a "0" output signal and the second flip-flop has a "—1" output signal. In addition, circuit means are provided to prevent the application of the second signal to the second flip-flop in response to the presence of the first signal to thereby indicate that the first signal precedes the second signal. More specifically, when the first signal occurs first, the first flip-flop has a "+1" output signal and the second flip-flop has a "0" output signal. The output signals from the first and second circuits (illustratively flip-flops) may be added together and integrated to provide a quantitative measure of the interval between the first and second signals.

These and other objects and advantages of the present invention will become more apparent in view of the following detailed description and drawings, in which.

Figure 1:
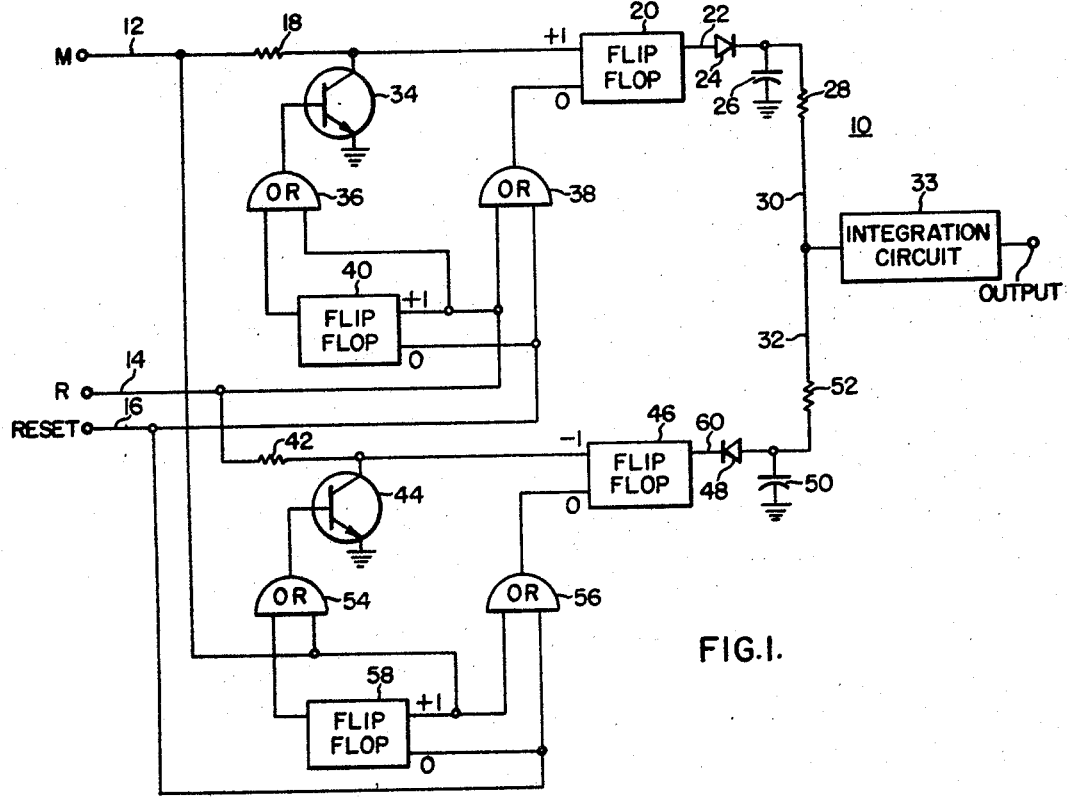
FIGURE 1 is a schematic representation of an illustrative time discriminator circuit in accordance with the principles of this invention.

Referring now to the drawings and in particular to FIG. 1, there is illustratively shown a time discriminator circuit 10 including a pair of input terminals 12 and 14 for receiving pulses, the interval between which is to be measured. A video or return pulse (R) corresponding to the target echo received by the radar system is applied to the input terminal 14, and the gate pulse (M) corresponding to a time reference signal generated by the radar system is applied to the input terminal 12. Further, a pulse may be applied to an input terminal 16 to reset the components of the circuit 10 to its original condition as will be explained in detail later. The gate pulse (M) may be applied through the input terminal 12 and a resistor 18 to the "+1" terminal of a flip-flop 20. As is understood in the art, a flip-flop is a digital, bistable circuit capable of providing first and second output signals dependent upon which input terminal (i.e., terminals "+1" or "0") a signal is applied. The flip-flop 20 has an output lead 22 which is connected through a switching device, such as, diode 24 and a resistor 28 to a lead 30. A capacitor 26 is connected between the common point of the diode 24 and the resistor 28 to ground.

The collector region of a switching device, such as transistor 34 is connected to the the common point between the resistor 18 and the "+1" input terminal of the flip-flop 20. The emitter region of the transistor 34 is connected to ground and the base region is connected to the output terminal of an OR gate 36. As is understood in the art, the OR gate 36 is responsive to signals applied to either of the input terminals to provide an output signal of a predetermined value. A flip-flop 40 is inserted in the time discriminator circuit 10 so that the outpt terminal of the flip-flop 40 is connected to one of the input terminals of the OR gate 36. The "+1" terminal is connected simultaneously to the other input terminal of the OR gate 36 and to the input terminal 14. The "0" input terminal of the flip-flop 40 is connected to the reset pulse connection 16. Further, the reset pulse connection 16 is connected to one of the input terminals of an OR gate 38 which has its output terminal connected to the "0" input terminal of the flip-flop 20. Further, the input terminal 14 is also connected to the other input terminal of the OR gate 38.

The input terimnal 14 is also applied through a resistor 42 to the "−1" input terminal of a flip-ffop 46. The reset pulse connection 16 is connected to one of the input terminals of an OR gate 56 whose output connection is made to the "0" input terminal of the flip-flop 46. Further, the reset pulse connection 16 is connected to the "0" input terminal of a flip-flop 58. Further, the common point between the resistor 42 and the "−1" input terminal of the flip-flop 46 is connected to the collector region of a switching device, such as, transistor 44. The emitter region of the transistor 44 is connected to ground and the base region thereof is connected to the output terminal of an OR gate 54. The input terminal 12 is simultaneously connected to the other input terminal of the OR gate 56, to one of the input terminals of the OR gate 54 and to the "+1" input terminal of the flip-flop 58. The output terminal of the flip-flop 58 is connected to the other input terminal of the OR gate 54.

The output terminal of the flip-flop 46 is connected through an output lead 60 to a switching device, such as, diode 48. Further, the diode 48 is connected through a resistor 52 to a lead 32 which is connected with the lead 30 to an integration circuit 33 to provide an output signal. The common point between the diode 48 and the resistor 52 is connected through a capacitor 50 to ground. It may be understood that the flip-flop 46 is capable of providing a first or "−1" signal and a second or "0" signal in response to input signals applied to the input terminals.

Generally, it is a desired object of the time discriminator circuit 10 to provide an indication of the sequence of the video and gate pulses and to provide a quantitative indication of the interval of time between these two pulses. More specifically, if the gate pulse M precedes the video pulse R, a positive voltage will be produced which is proportional to the difference in time between the pulses M and R. If the video pulse R precedes the gate pulse M, the output voltage will be negative and will be proportional to the difference in time between the pulses R and M. On the other hand, if the gate and video pulses R and M arrive at the same instant of time, the output voltage will be zero.

Briefly, the operation of the time discriminator circuit 10 as described with regard to FIG. 1 will now be explained with reference to FIGS. 2A, B and C which show the voltage condition at various points upon the circuit 10. First, in order to restore the circuit 10 to an initial condition, a reset pulse is applied at time $t_0$ to the reset pulse connection 16. The reset pulse is applied to one terminal of the OR gate 38 which in turn applies a signal to the "0" input terminal of the flip-flop 20 to provide a corresponding "0" output signal from the flip-flop 20. In addition, the reset pulse is applied to the OR gate 56 which in response applies a signal to the "0" input terminal of the flip-flop 46 to establish a zero output signal therefrom.

Figure 2A:
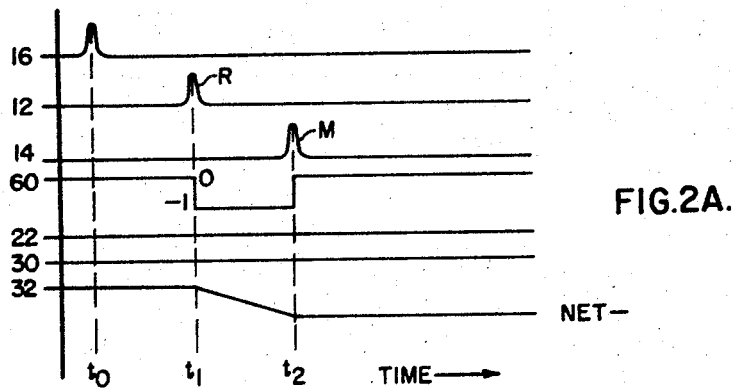
FIGS. 2A, 2B and 2C are time diagrams respectively illustrating the symbolic electric conditions at various points in the circuit of FIG. 1.

With reference specifically to FIG. 2A, the operation of the circuit 10 will be explained for the case when the video pulse R is applied to the input circuit 12 at a time $t_1$ which precedes the application of the gate pulse M at $t_2$ to the input terminal 14. The video pulse R is applied to the "+1" input terminal of the flip-flop 40 thereby establishing a corresponding output signal which is applied to the OR gate 36. In response to a signal at one of its input terminals, the OR gate 36 applies an appropriate signal to the base of the transistor 34 thereby biasing the transistor 34 to a low impedance condition and thereby shunting the resistor 18 to ground. As a result, the gate pulse M which is applied to the resistor 18 is effectively short-circuited to ground and the flip-flop 20 remains in its "0" condition thereby establishing a "0" voltage signal upon the output lead 22 as shown in FIG. 2A. Further, the video signal R is applied through the resistor 42 to the "−1" input terminal of the flip-flop 46 thereby imposing upon output lead 60 a "−1" voltage signal as shown in FIG. 2A.

At time $t_2$, the gate pulse M is applied through the input terminal 12 to the input terminal of the flip-flop 56 to thereby establish a voltage signal upon one of the "0" input terminals of the flip-ffop 46 and to drive the flip-flop 46 from a "−1" to a "0" state. Thus as seen in FIG. 2A, the flip-flop 46 will provide a "−1" output signal upon the lead 60 between times $t_1$ and $t_2$. The "−1" signal is directed through the diode 48 to charge the capacitor 50. The capacitor 50 is discharged through the resistor 52 to provide a signal current as shown in FIG. 2A through the conductor 32. Since the flip-flop 20 is in "0" condition, no signal will be passed by the diode 24 and no signal will be placed upon the lead 30. It is noted that the diodes 24 and 48 are respectively biased to pass positive and negative signals and to prevent signals from the other lead to be disposed upon their associated flip-flops. Further, it is noted that the signals imposed upon the leads 30 and 32 may be applied to the integration circuit 33 to provide a summing of these signals. Thus, when the video pulse R precedes the gate pulse M, a negative signal will be provided having a magnitude proportional to the interval of time between $t_1$ and $t_2$.

Figure 2B:
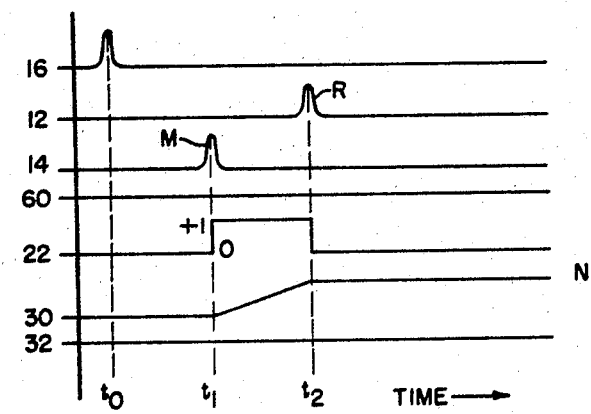
Figure 2C:
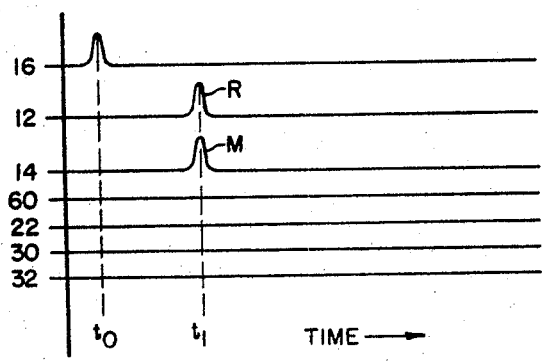

In the instance when the gate pulse M is applied at a time $t_1$ which precedes the application of the video pulse R at a time $t_2$, a positive voltage will be derived with its magnitude proportional to the interval of time between $t_1$ and $t_2$. More specifically, a reset pulse is applied at the reset pulse connection 16 at a time $t_0$ to establish the flip-flops 20 and 46 in their zero condition. Next, a gate pulse M is applied to the terminal 12 at time $t_1$ to thereby place the flip-flop 20 in its +1 condition thereby establishing a +1 voltage signal upon the output lead 22. Further, the gate pulse M is applied to the "+1" terminal of the flip-flop 58 to thereby activate the OR gate 54 and to apply a signal to the base region of the transistor 44. As a result, the transistor 44 is rendered conductive to thereby short-circuit the resistor 42 to ground. At time $t_2$, the video pulse R is applied through the terminal 14 and the OR gate 38 to thereby place the flip-flop 20 in its "0" state and to establish an output "0" voltage upon the output lead 22. As seen in FIG. 2B, a "+1" output signal will be applied to the output lead 22 between the times $t_1$ and $t_2$, whereas a zero voltage signal will be applied to the output lead 60. The positive output signal will be passed by the diode 24 to charge the capacitor 26. The capacitor 26 will then discharge through the resistor 28 and the lead 30 to provide a net positive signal whose magnitude is proportional to the time interval between $t_1$ and $t_2$.

In the instance when the gate pulse M and the video pulse R are applied to the respective terminals at the same instance of time, the time discriminator circuit 10 will provide a zero output voltage. First, as explained above, a reset pulse is reapplied to the connection 16 at time $t_0$ to thereby set the flip-flops 20 and 46 in their "0" states. Next, the gate pulse M and the video pulse R are applied through the terminals 12 and 14 respectively at the same time $t_1$. The gate pulse M disposes the flip-flop 58 in its "+1" state to thereby bias as explained above the transistor 44 to its conductive condition and to short-circuit the resistor 42 to ground. As a result, the video pulse R is directed through the resistor 44 to ground and is not applied to the flip-flop 46. In addition, the video pulse R is applied to the flip-flop 40 to thereby establish the flip-flop 40 in its "+1" state and to render the transistor 34 as explained above in its conductive condition. As a result, the resistor 18 is short-circuited to ground thereby preventing the application of the gate pulse M to the flip-flop 20. Thus, both the flip-flops 20 and 46 are maintained in their "0" states and "0" output voltages are applied to the output leads 22 and 60, and to the leads 30 and 32.

A significant advantage of the time discriminator circuit of this invention is that an error signal will be provided no matter how large the interval between the video pulse and the gate pulse. Further, in those situations where the radar system incorporating the time discriminator circuit of this invention is carried by a vehicle such as an airplane whose position has a tendency to be rapidly changed as in an air to ground mode by the buffeting of the surrounding atmosphere, there will be certain variations in the return echo signal due to the change of the position of the aircraft. Typically, the video pulse R varies about an average value which the time discriminator of this invention may sense to provide an error signal proportional to the difference between the gate pulse M and the average value of the video pulse R.

Though the time discriminator circuit as described with regard to FIG. 1 has particular application with regard to a tracking radar system, this circuit may be used to detect the occurrence of two events at a fixed repetition rate or, if one signal is time modulated about the other, to determine the modulation envelope. Further, the time discriminator circuit of this invention could be used in an optical or infrared scanning system which is designed to scan a desired target and to track the center of the target. Illustratively, the scanning radiation system could detect the contrast between the target and the background to provide two pulses in time relation to the start of the scan indicating the edges of the target. Once these two pulses corresponding to the edges of the target are obtained, a conventional range tracking loop could be established to center a tracking gate between the two pulses utilizing a time discriminator circuit as shown and described with respect to the circuit of FIG. 3. Further, the output signal of the range track loop could be utilized as a position or aiming control.

Figure 3:
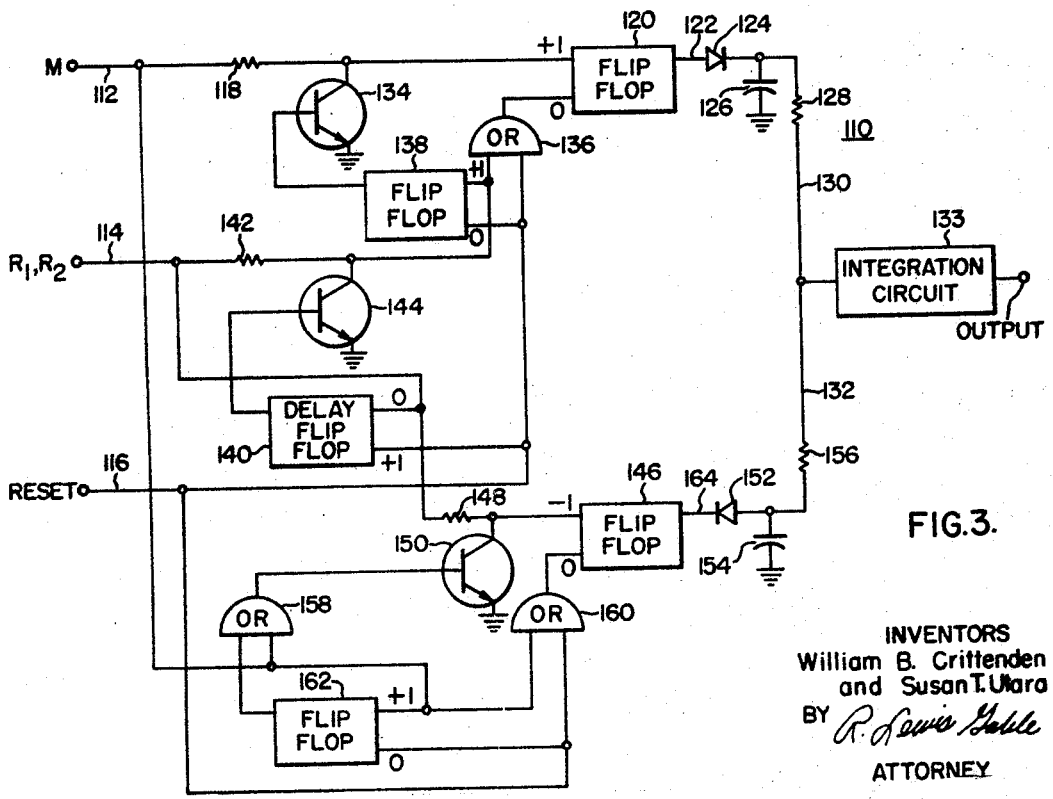
FIG. 3 is a schematic representation of a further embodiment of the time discriminator circuit in accordance with the teachings of this invention.
Figure 4A:
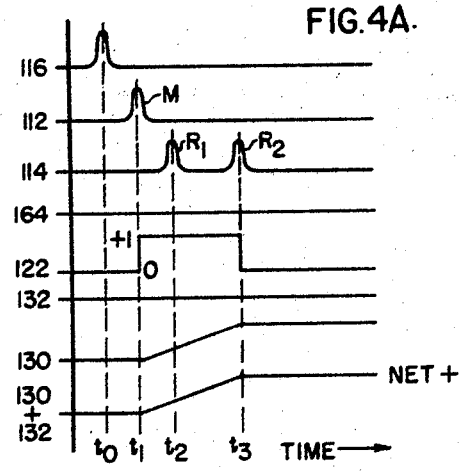
FIGS. 4A through 4E are time diagrams respectively illustrating the symbolic electrical conditions at various points in the circuit of FIG. 3.

Referring now to FIG. 3, there is shown a time discriminator circuit 110 capable of determining the position of a gate pulse M with regard to a set of repeating video pulses $R_1$ and $R_2$ and to provide an output signal whose magnitude is proportional to the time interval between the gate pulse M and the midpoint between the set of video pulses $R_1$ and $R_2$. More specifically, a gate pulse M is applied to an input terminal 112, and the set of video pulses $R_1$ and $R_2$ are applied to an input terminal 114. A reset pulse is applied to the reset pulse connection 116 to place the time discriminator circuit 110 in its initial condition. Referring now to FIG. 4A, the operation of the circuit 110 in the instance where the gate pulse M is applied at a time $t_1$ prior to the receipt of the set of video pulses $R_1$ and $R_2$ will be explained. First, the reset pulse is applied through the reset pulse connection 116 at time $t_0$ to an OR gate 136 which applies an output signal to the "0" input terminal of a flip-flop 120. In addition, the reset pulse is applied to an OR gate 160 to provide a signal to the "0" input terminal of a flip-flop 146. Thus, initially the flip-flops 120 and 146 provide a "0" output signal onto the leads 122 and 164 respectively. Further, the reset pulse is applied through the connection 116 to the "+1" terminal of a delay flip-flop 140. In response to the reset pulse, the flip-flop 140 applies a "+1" signal to the base region of a switching device, such as transistor 144, thereby shorting a resistor 142 to ground. The reset pulse is also applied to the "0" input terminals of the flip-flops 138 and 162 to provide "0" signals therefrom. The output signal from the flip-flop 138 is connected to the base region of a switching device, such as transistor 134, to thereby render the transistor non-conductive and to allow an input pulse placed upon the terminal 112 to be applied to the flip-flop 120. Further, the output of the flip-flop 162 is applied through an OR gate 158 to the base of a switching device, such as transistor 150. The transistor 150 is thereby placed in a high impedance state and an input signal may be applied through the terminal 114 and a resistor 148 to the "−1" terminal of the flip-flop 146.

At time $t_1$, the gate pulse M is applied through the input terminal 112 and a resistor 118 to the "+1" input terminal of the flip-flop 120 to thereby place the flip-flop 120 in its "+1" state and to establish a "+1" output signal upon the output lead 122. The gate pulse M is also applied to the "+1" input terminal of the flip-flop 162 to thereby establish an output signal upon the OR gate 158. In turn, the OR gate 158 applies a signal to the base of the transistor 150 to render the transistor 150 conductive thereby short-circuiting the resistor 148 to ground. Since the transistors 144 and 150 are disposed in a conductance state the first video pulse $R_1$ is shorted through the resistor 142 and the transistor 144 to ground and through the resistor 148 and the transistor 150 to ground. Thus, the first video pulse $R_1$ is not applied to either of the flip-flops 120 or 146 thereby maintaining these flip-flops in their previous states. However, the first video pulse $R_1$ is applied to the delay flip-flop 140 to provide after a time delay characteristic of the flip-flop 140 a "0" output signal to the transistor 144 to thereby render the transistor 144 to a high impedance state. After the delay period, a signal placed upon the input terminal 114 will not be shunted to ground but will be applied to the OR gate 136. Thus, at time $t_3$, the second pulse $R_2$ is applied through the resistor 142 to the OR gate 136 thereby establishing a signal upon "0" input terminal of the flip-flop 120. In response to this signal, the flip-flop 120 is driven from a "+1" to a "0" state. Further, pulse $R_2$ is shunted to ground by transistor 150 thereby maintaining the flip-flop 146 in its "0" state. Thus, the flip-flop 120 will establish from $t_1$ to $t_3$ a "+1" signal upon the output lead 122 which will be passed through a switching device, such as diode 124, to charge a capacitor 126. The capacitor 126 will discharge through a resistor 128 and a lead 130 to provide a signal current at the output of the circuit 110. Since a "0" signal was applied to the output lead 164 by the flip-flop 146 there will be no signal passed through the diode 152 and the resistor 156 to a lead 132. Further, a suitable integration circuit 133 sums the signals applied to the leads 130 and 132 to provide an output signal.

Thus, when a gate pulse M is applied at a time $t_1$ before the occurrence of either of the video signals $R_1$ and $R_2$, there will be a signal at the output terminal of the circuit 110 of a positive polarity and whose magnitude will indicate the interval between the occurrence of the gate pulse at $t_1$ and the midpoint between the occurrences of the video signals $R_1$ and $R_2$.

Figure 4B:
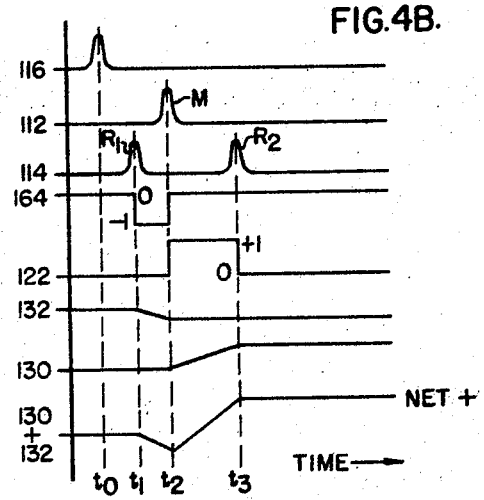

In that case where the gate pulse M occurs at the time $t_2$ between the occurrence of the video pulse $R_1$ at time $t_1$ and the midpoint between the occurrence of the video pulses $R_1$ and $R_2$ respectively at times $t_1$ and $t_3$, a net positive signal will be provided at the output of the circuit 110 in the following manner. First, as explained above, a reset pulse will be applied to the connection 116 at time $t_0$. The reset pulse will be applied through the OR gates 136 and 160 to render the flip-flops 120 and 146 in their zero condition. Further, the reset pulse will be applied to the "+1" terminal of the flip-flop 140 to thereby render the transistor 144 conductive and to short the resistor 142 to ground. At time $t_1$, the first video pulse $R_1$ is applied through the input terminal 114 and the resistor 148 to the "−1" input terminal of the flip-flop 146, to thereby provide a "−1" output signal upon the output lead 164. In addition, the first video pulse $R_1$ is applied to the "0" input terminal of the delay flip-flop 140 to thereby provide after the characteristic delay of the flip-flop 140 a "0" output signal. In response to the zero output signal, the transistor 144 is rendered non-conductive. Next, at time $t_2$, the gate pulse M is applied through the resistor 118 to the "+1" terminal of the flip-flop 120 to thereby provide a "+1" output signal from the flip-flop 120 on the output lead 122. It is noted that transistor 134 has remained non-conductive because the first video pulse $R_1$ was shunted by transistor 144 to ground and was not applied to the "+1" terminal of the flip-flop 138. Further, the gate pulse M is applied to the OR gate 160 to establish a signal upon the "0" input terminal of the flip-flop 146 thereby driving the flip-flop from a "−1" to a "0" state. As shown in FIG. 4B, a "−1" output signal will be placed upon the lead 164 between the time $t_1$ and the time $t_2$. Further, the gate pulse M is placed upon the "+1" input terminal of the flip-flop 162 to apply a signal to the base of the transistor 150 thereby rendering the transistor 150 conductive. Thus, a signal placed upon the input terminal 114 at a later time will not be applied to the flip-flop 146 but will be short-circuited to ground by the transistor 150.

At time $t_3$, a second video pulse $R_2$ will be applied through the resistor 142 to one of the inputs of the OR gate 136. In response to the input signal, the OR gate 136 will apply a signal to the "0" input terminal of the flip-flop 120 to thereby place the flip-flop 120 in its "0" state. Thus, as shown in FIG. 4B, a "+1" signal will be applied to the output lead 122 in the time interval between $t_2$ and $t_3$. The negative and positive signals applied to the conduits 164 and 122 respectively will be integrated respectively by the resistor 156 and the capacitor 154, and the capacitor 126 and resistor 128 to provide the signals as shown in FIG. 4B upon the conduits 132 and 130. Further, the additional integration circuit 133 may be provided to sum these positive and negative signals to provide a net positive signal whose magnitude is proportional to the interval between $t_2$ and the midpoint between $t_1$ and $t_3$.

Figure 4C:
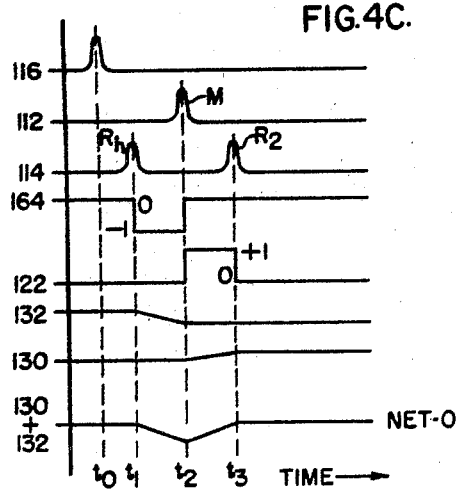

Referring now to FIG. 4C, the operation of the time discriminator circuit 110 will be explained for the situation when the gate pulse M is applied at time $t_2$ which falls at the midpoint between the occurrence of the video pulses $R_1$ and $R_2$ at times $t_1$ and $t_3$ respectively. As explained above, a reset pulse is applied at the connection 116 to place the flip-flops 120 and 146 in their "0" state and to render the transistor 144 conductive. At time $t_1$, the first video pulse $R_1$ will be applied through the input terminal 114 and the resistor 148 to the "−1" input terminal of the flip-flop 146 thereby placing a "−1" output signal upon the lead 164. The video pulse $R_1$ is short-circuited through the resistor 142 and the transistor 144 to ground and will not be applied to the flip-flop 120 thereby maintaining the flip-flop in its "0" state. Further, it is noted that the first video pulse $R_1$ is applied to the flip-flop 140 to thereby render after the characteristic delay of the flip-flop 140 (i.e., usually the width of the pulse applied) the transistor 144 non-conductive.

At time $t_2$, the gate pulse M is applied through the input terminal 112 and the resistor 118 to the flip-flop 120 to thereby place a "+1" signal upon the output lead 122. The gate pulse M is also applied through the OR gate 160 to drive the flip-flop 146 from a "−1" to a "0" state and to thereby place a "0" output signal upon the lead 164. At time $t_3$, the second video pulse $R_2$ is applied through the resistor 142 and the OR gate 136 to thereby place a signal at the "0" input terminal of the flip-flop 120. In response to this input signal, the flip-flop 120 establishes a "0" voltage signal upon the output lead 122. Due to the application of the gate pulse M to the flip-flop 162 at time $t_2$, the flip-flop 162 provides a pulse to the OR gate 158 which in turn biases the transistor 150 to a conductive condition and thereby short-circuits the resistor 148 to ground. Thus, when the second video pulse $R_2$ is applied to the resistor 148 it will be short-circuited to ground and it will not affect the flip-flop 146 which remains in its "0" state. The output signal applied to the lead 122 will be integrated by the capacitor 126 and the resistor 128, and the output applied to the output lead 164 will be integrated by the capacitor 154 and resistor 156. The resultant voltages, as shown in FIG. 4C, are a negative voltage as applied to the lead 132 and a positive voltage as applied to the lead 130 which when added together and summed by the integration circuit 133 will provide a net "0" signal indicating that the gate pulse M is disposed precisely between the first and second video pulses $R_1$ and $R_2$.

Figure 4D:
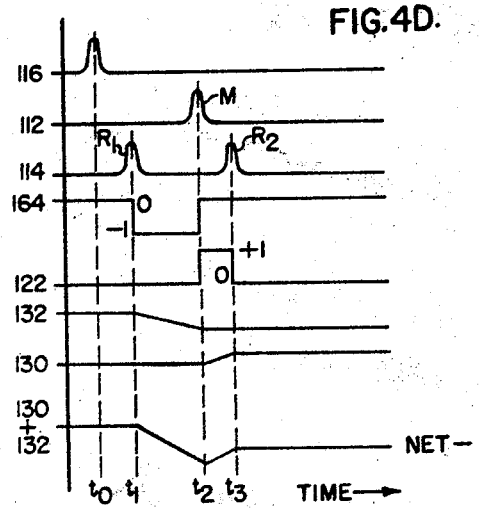

Referring now to FIG. 4D, the operation of the time discriminator circuit 110 will be explained for the case when the gate pulse M is applied to the input terminal 112 at an instant between the midpoint of $t_1$ and $t_3$, and $t_2$. After a reset pulse has been applied to the connection 116 to reset the time discriminator circuit 110 as described above, the first video pulse $R_1$ is applied to the input terminal 114 to thereby place the flip-flop 146 in its "−1" state and to establish a "−1" voltage signal upon the lead 164. Further, the input pulse $R_1$ drives the delay flip-flop 140 to its "0" state to thereby unbias the transistor 144 after about one pulse width and to allow the second video pulse $R_2$ to be applied through the OR gate 136 to the "0" input terminal of the flip-flop 120. At $t_2$, the gate pulse M is applied through the resistor 118 to the flip-flop 120 to thereby place a "+1" voltage signal upon the lead 122. Further, the gate pulse M is directed through the OR gate 160 to render the flip-flop 146 in its "0" state, and is also applied the flip-flop 162 to render the transistor 150 conductive thus preventing (during this cycle) a further signal from being applied to the flip-flop 146. At time $t_3$, the second video pulse $R_2$ is allowed to pass through the resistor 142 and the OR gate 136 to the "0" input terminal of the flip-flop 120 to thereby place a "0" output voltage upon the lead 122. Further, the second video pulse $R_2$ is shunted through the resistor 148 and the transistor 150 to ground. It is noted that the gate pulse M at time $t_2$ activated the flip-flop 162 to render the transistor 150 conductive thereby preventing the video pulse $R_2$ from being applied to the flip-flop 146. Thus, a negative signal is applied upon the lead 132 and a positive signal is applied upon the lead 130 which may be summed by the circuit 133 to provide a negative output signal whose magnitude is proportional to the interval between the midpoint between times $t_1$ and $t_3$, and $t_2$.

Figure 4E:
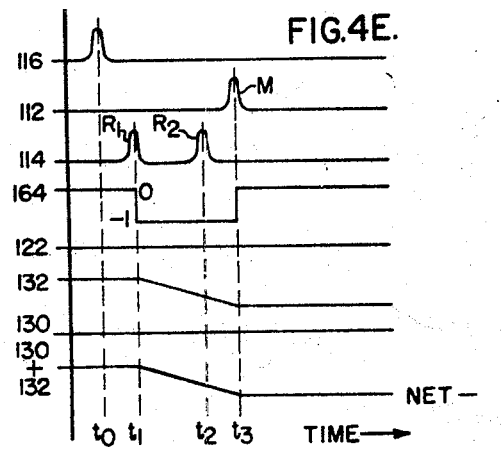

Referring now to FIG. 4E, the operation of the time discriminator circuit 110 will be explained for the case when the gate pulse M is applied to the input terminal 112 at a time $t_3$ after the application of the second video pulse $R_2$ at time $t_2$. After the time discriminator circuit 110 has been reset to its initial operating condition as explained above, the first video pulse $R_1$ is applied at time $t_1$ through the resistor 148 to thereby render the flip-flop 146 in its "−1" state, to place the flip-flop 140 after its delay period in its "0" state, and to thereby render the transistor 144 non-conductive. At time $t_2$, the second video pulse $R_2$ is applied through the resistor 142 to the "+1" input terminal of the flip-flop 138. In response to this signal, the flip-flop 138 applies a biasing signal to a transistor 134 to thereby render the transistor 134 conductive and to short-circuit the resistor 118 to ground. It is noted that at time $t_2$, the flip-flop 120 remains in its "0" state and the flip-flop 146 remains in its "−1" state. At time $t_3$, the gate pulse M is applied through the OR gate 160 to render the flip-flop 146 to its "0" state and to place the "0" voltage signal upon the lead 164. Further, the gate pulse M is not applied at this time to the flip-flop 120 since this pulse is short-circuited through the transistor 134 to ground. As shown in FIG. 4E, a "−1" voltage signal is applied between times $t_1$ and $t_3$ to the lead 164 to thereby charge the capacitor 154. This voltage is discharged through the resistor 156 to the lead 132 providing a negative signal as shown in FIG. 4E. It is noted that a "0" signal is applied to the lead 130 and the output of the time discriminator circut 110 provides a net negative signal whose magnitude indicates the interval of time between the midpoint between $t_1$ and $t_2$, and $t_3$.

Since numerous changes may be made in the above described apparatus and different embodiments of the

We claim as our invention:

1. A time discriminator circuit for indicating the sequence of and the interval between the application of first and second input signals comprising first bistable means for providing an output signal in response respectively to said first and second input signals, second bistable means for providing an output signal in response respectively to said first and second input signals, third and fourth means for respectively applying said first and second input signals to said first means, and fifth and sixth means for applying respectively said first and second input signals to said second means, said third means responsive to said second signal to prevent the application of said first input signal to said first means, said sixth means responsive to said first signal to prevent the application of said second input signal to said second means.

2. A time discriminator circuit as claimed in claim 1, wherein there is included a first switching means connected to said first bistable means for allowing said output signal therefrom to pass therethrough, and second switching means connected to said second bistable means for allowing said output signal therefrom to pass therethrough.

3. A time discriminator circuit as claimed in claim 2, wherein said first and second switching means are connected to a seventh means for summing the signals applied thereto to derive an output signal indicative of the interval time between said first and second input signals.

4. A time discriminator circuit as claimed in claim 1, wherein said third means includes a first switching means for circumventing said first signal from said first bistable means and responsive to said second signal, and said sixth means includes a second switching means for circumventing said second signal from said second bistable means in response to said first signal.

5. A time discriminator circuit as claimed in claim 4, including seventh bistable means having first and second input terminals for providing first and second output signals in response to signals applied respectively to said first and second terminals, said third means applying said first input signal to said first terminal of said seventh bistable means, said seventh bistable means applying to said second switching means said first output signal therefrom for rendering said second switching means to an ON condition and said second signal for rendering said second switching means to an OFF condition, and eighth bistable means having first and second input terminals for providing first and second output signals in response to signals applied to said first and second terminals, said sixth means applying said second signal to said first terminal of said eighth bistable means, said eighth bistable means applying to said first switching means said first signal therefrom for rendering said first switching means in an ON condition and said second signal for rendering said first switching means in an OFF condition.

6. A time discriminator circuit as claimed in claim 5, wherein said seventh and eighth bistable means are flip-flops.

7. A time discriminator circuit as claimed in claim 5, wherein there is provided ninth means for applying a reset signal to said second terminals of said seventh and eighth bistable means.

8. A time discriminator circuit as claimed in claim 7, wherein said fourth means includes a first OR gate whose output terminal is connected to said first means and having first and second input terminals, said first input terminals of said first OR gate being connected to said second terminal of said eighth bistable means and to said ninth means, said first means including a second OR gate having an output terminal connected to said second means and having first and second input terminals, said first terminal of said second OR gate being connected to said second terminal of said seventh bistable means and to said ninth means, said second signal being applied to the second terminal of said first OR gate, said first signal being applied to the second terminal of said second OR gate.

9. A time discriminator circuit as claimed in claim 1, wherein said fourth and fifth means receive a third input signal after the application of the second signal, said time discriminator circuit including seventh means for blocking said fourth means from applying said second input signal to said first means and responsive to the second input signal to allow said fourth means to apply said third input signal to said first means after a predetermined time delay.

10. A time discriminator circuit as claimed in claim 9, wherein said seventh means include a switching means for circumventing said second signal from said first means and a delay flip-flop having first and second input terminals which is connected to said switch means for providing a first signal capable of rendering said switching means in an ON condition and a second signal capable of rendering said switching means in an OFF condition in response respectively to signals applied at the first and second terminals thereof.

References Cited
UNITED STATES PATENTS 3,005,165 10/1961 Lenigan _____ 328—133 XR
3,056,083 9/1962 Peterson _____ 324—68

DONALD D. FORRER, Primary Examiner
JOHN ZAZWORSKY, Assistant Examiner

U.S. Cl. X.R.
307—234; 324—68; 328—109, 133